Patented Dec. 12, 1950

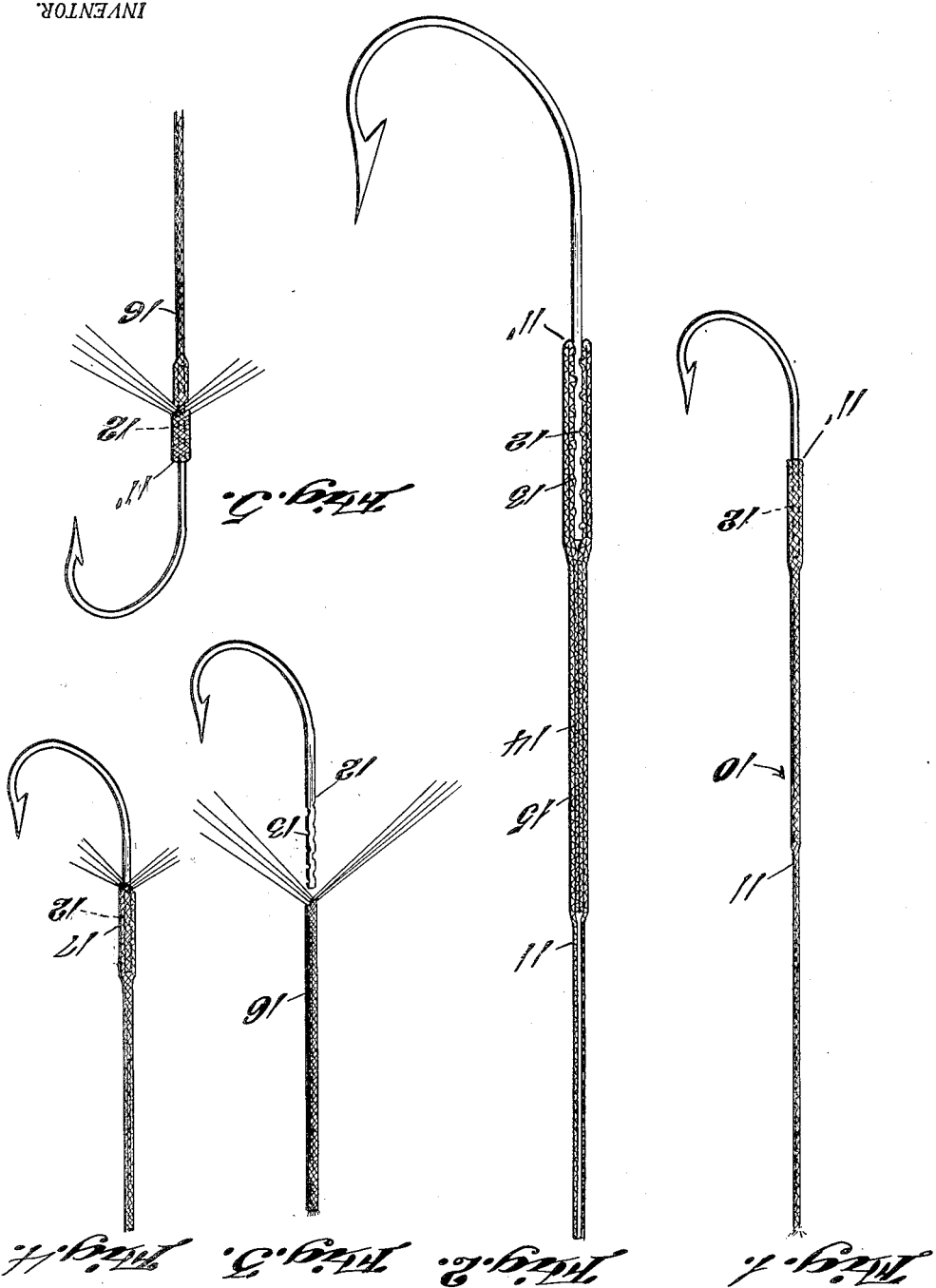

2,533,418

UNITED STATES PATENT OFFICE 2,533,418

METHOD OF ATTACHING A LEADER TO A HOOK

Dona J. Benoit, Pawtucket, R. I.

Application April 28, 1948, Serial No. 23,660

1 Claim. (Cl. 43—44.83)

This invention relates to an improvement in a snelled fishhook, particularly the leader thereof and a method of attaching the same to the shank of the fishhook.

Fishhook snells or leaders are made of various materials and are usually attached to the shank of the fishhook by winding a thread about the shank and the leader which is laid lengthwise on the shank. An adhesive is placed on the wrapping to secure the parts together. It often happens that the wrapping becomes chaffed in use or is bitten by the fish and loosens to free the hook.

The general object of the invention is to improve generally on snelled hooks of the above general description whereby to provide a more secure attachment of the leader to the shank of the hook.

A more specific object of the invention is the provision of a fishhook leader made of a tubular braided material within which will be tightly enclosed the shank of the hook.

Another object of the invention is the provision of a fishhook leader made of a tubular braided material which will be braided directly onto the shank of the hook in the process of making the leader.

Another object of the invention is to provide a leader which will be of a double thickness at that portion attached to the hook and for a substantial distance beyond the end of the shank.

With these and other objects in view, the invention consists of certain novel features of construction, as will be more fully described and particularly pointed out in the appended claim.

In the accompanying drawings:

Figure 1 is a view of a fishhook with a leader attached thereto embodying my invention;

Figure 2 is a similar view but in section and on an enlarged scale;

Figure 3 is a view illustrating one step in the method of making the braid showing the hook in position to have the individual yarns of the braid braided thereabout;

Figure 4 is a similar view, but showing the braid as having been braided directly to the shank of the hook for a substantial distance thereon; and Figure 5 is a view illustrating the braiding as being reversed, so as to enclose the previously braided portion of the leader.

The invention comprises in general in making the fishhook leader of a tubular braided material and attaching the leader to the shank of the hook by tightly braiding the same directly thereon. A protective coating may then be placed upon the leader so as to stiffen the same and also to aid in securing the same to the hook and to prevent unraveling of the ends of the braid.

A leader thus made and attached to the hook may be found suitable in the smaller sized hooks. However, it is preferable to first braid a short length of leader, then to continue the braiding on the hook shank a substantial distance. The braiding is then reversed and tightly braided over the previously braided portion so as to enclose the same within the outer braiding. Thus a leader is provided which in effect is doubled back upon itself so as to provide a double thickness for a substantial distance along the shank of the hook and beyond the shank of the hook, the hook being held by the double portion of the braid by the tight engagement of the braid thereon. A protective coating, such as a waterproof shellac, is then placed on the braid and will flow between the yarns to adhesively secure the same together and stiffen the leader. The leader may be made of various materials such as cotton, silk, or synthetic yarns which may be found suitable for use for fishhook leaders.

Referring to the drawings for a more detailed description of the invention, 10 designates generally a snelled hook having a leader 11 of a braided formation and attached to the shank 12 of the hook. The shank 12 may be roughened or serrated as at 13 to provide a more secure engagement between individual yarns of the leader and the shank. As shown in Figure 2, the leader 11 is doubled back upon itself as at 11' so as to enclose a substantial length 14 thereof within an outer portion 15 of the braid. The shank 12 extends within the double portion and is tightly secured thereto by frictional engagement of the braid therewith. It has been found desirable to coat the shank of the hook and the leader with an adhesive (not shown) such as a waterproof shellac to additionally secure the leader to the shank and to stiffen the leader and to also prevent relative movement between the individual yarns of the braid.

Preferably, the leader is made by braiding first a short length thereof such as at 16 shown in Figure 3. The hook is then placed in position to be incorporated within the braid and the braiding continued onto the hock as shown at 17 in Figure 4. The yarns are under sufficient tension so that the yarns are braided tightly over the shank 12 and enter the serrations 13. The braiding is then reversed such as shown in Figure 5 which may be accomplished by reversing the hook. The braiding is then continued to tightly enclose the previously braided portion on the hook and the portion 16. The braiding is continued to extend beyond the portion 16 a desirable length to provide a tube of single thickness. The application of a shellac coating may be omitted if desired and the frictional contact of the braiding on the shank will suffice to firmly attach the leader to the shank.

It has been found that a leader made and attached to a hook in the manner herein described is much stronger and will sustain more abuse than the usual prior art leaders and the manner in which they are attached to the hook.

I claim:

The method of making and attaching a leader to a fishhook which consists in braiding a length of tubular braid leader, then positioning the shank of the hook within the braid tightly braiding the leader onto the shank of the hook for a substantial length thereon, reversing the direction of the braiding to enclose and extend the leader beyond the previously braided portion a desired length.

DONA J. BENOIT.

REFERENCES CITED

The following references are of record in the file of this patent:

UNITED STATES PATENTS

| Number | Name | Date |
|---|---|---|
| 341,257 | Mansfield | May 4, 1886 |
| 473,038 | White | Apr. 19, 1892 |
| 1,093,000 | Kinsey | Apr. 14, 1914 |
| 2,094,267 | Faria | Sept. 28, 1937 |